United States Patent
Laitinen

(10) Patent No.: US 8,726,023 B2
(45) Date of Patent: May 13, 2014

(54) AUTHENTICATION USING GAA FUNCTIONALITY FOR UNIDIRECTIONAL NETWORK CONNECTIONS

(75) Inventor: Pekka Laitinen, Helsinki (FI)

(73) Assignee: Nokia Corporation, Espoo (FI)

(*) Notice: Subject to any disclaimer, the term of this patent is extended or adjusted under 35 U.S.C. 154(b) by 1981 days.

(21) Appl. No.: 11/108,848

(22) Filed: Apr. 19, 2005

(65) Prior Publication Data

US 2006/0174117 A1    Aug. 3, 2006

(30) Foreign Application Priority Data

Feb. 3, 2005 (EP) .................................... 05002300

(51) Int. Cl.
 *H04L 29/06* (2006.01)
 *H04L 9/32* (2006.01)
 *H04L 9/00* (2006.01)
 *H04L 9/30* (2006.01)
 *H04L 9/08* (2006.01)
 *G06F 21/00* (2013.01)

(52) U.S. Cl.
 USPC ........... 713/169; 713/151; 713/156; 713/167; 713/170; 713/171; 713/176; 713/182; 380/30; 380/278; 380/279

(58) Field of Classification Search
 USPC ......... 713/156, 169, 176, 182, 151, 167, 170, 713/171; 380/30, 278, 279
 See application file for complete search history.

(56) References Cited

U.S. PATENT DOCUMENTS

| | | | |
|---|---|---|---|
| 7,484,090 B2* | 1/2009 | Ohmori et al. ............... | 713/158 |
| 7,562,384 B1* | 7/2009 | Huang ............................. | 726/5 |
| 7,574,599 B1* | 8/2009 | Zhang ............................ | 713/168 |
| 2002/0063925 A1* | 5/2002 | Otani et al. ................... | 359/125 |
| 2003/0061275 A1* | 3/2003 | Brown et al. ................. | 709/203 |
| 2003/0061386 A1* | 3/2003 | Brown et al. ................. | 709/246 |
| 2003/0226036 A1* | 12/2003 | Bivens et al. ................ | 713/201 |
| 2005/0015583 A1 | 1/2005 | Sarkkinen et al. | |
| 2005/0198379 A1* | 9/2005 | Panasyuk et al. ............ | 709/239 |
| 2005/0201353 A1* | 9/2005 | Lee et al. ...................... | 370/349 |

(Continued)

FOREIGN PATENT DOCUMENTS

| | | |
|---|---|---|
| EP | 1492381 A1 | 12/2004 |
| EP | 1844595 A1 | 10/2007 |

OTHER PUBLICATIONS

3rd Generation Partnership Project; Technical Specification Group Services and System Aspects: Generic Authentication Architecture (GAA) Generic Bootstrapping Architecture (Release 6). Dec. 2004.*

(Continued)

*Primary Examiner* — Yin-Chen Shaw
*Assistant Examiner* — Kari Schmidt
(74) *Attorney, Agent, or Firm* — Mitz, Levin, Cohn, Ferris, Glovsky & Popeo, P.C.

(57) ABSTRACT

Methods, a client entity, network entities, a system, and a computer program product perform authentication between a client entity and a network. The network includes at least a bootstrapping server function entity and a network application function entity. The client entity is not able to communicate with both of the network entities in a bidirectional manner. The 3GPP standard Ub reference point between the client entity and the bootstrapping server function entity is not utilized for authentication purposes, such as authentication using GAA functionality for unidirectional network connections.

36 Claims, 10 Drawing Sheets

(56) References Cited

U.S. PATENT DOCUMENTS

2005/0289341 A1* 12/2005 Ritola et al. .......... 713/168
2006/0075242 A1* 4/2006 Aissi et al. .......... 713/176
2006/0079205 A1* 4/2006 Semple et al. ........ 455/411

OTHER PUBLICATIONS

ETSI TS 133 220, V6.3.0, 3GPP TS 33.220 version 6.3.0 Release 6, Universal Mobile Telecommunications System (UMTS); Generic Authentication Architecture (GAA); Generic bootstrapping architecture, Dec. 2004.

Niemi, et al., "Hypertext Transfer Protocol (HTTP) Digest Authentication Using Authentication and Key Agreement (AKA)", IETF RFC 3310, Sep. 2002.

Calhoun, et al., "Diameter Base Protocol", IETF RFC 3588, Sep. 2003.

* cited by examiner

AUTHENTICATION USING GAA FUNCTIONALITY FOR UNIDIRECTIONAL NETWORK CONNECTIONS

FIELD OF THE INVENTION

The present invention relates to methods, network entities, a system, and a computer program product for authentication between a client entity and a network, wherein the client entity is not able to communicate with the network in a bidirectional manner. In particular, the present invention relates to authentication using functionalities in accordance with a generic authentication architecture, GAA, in e.g. broadcast scenarios.

BACKGROUND OF THE INVENTION

In recent years, various kinds of communication systems, in particular mobile and/or IP-based (IP: Internet Protocol) communication systems, as well as a multitude of services offered in these systems have been developed.

In such advanced communication systems, such as e.g. Third Generation mobile communication networks currently under development by the Third Generation Partnership Program (3GPP), aspects relating to security and trustworthiness are playing a more and more important role.

Starting from the concept of subscriber certificates, which support services that mobile operators provide and whose provision assists mobile operators, and in consideration of a need for more generic security capabilities, 3GPP standardization work lately concentrated on the evolution of a generic authentication architecture (GAA). As can be gathered from FIG. 1 showing an overview of a generic authentication architecture environment in interrelation with a home subscriber system HSS 14, a user equipment UE 12, and a network entity NE 13, GAA 11 basically consists of three sub-aspects. That is, a generic bootstrapping architecture (GBA) 11b, subscriber certificates 11a, and an authentication proxy (AP) 11c e.g. based on HTTPS (Secure Hypertext Transport Protocol). Thereby, the generic bootstrapping architecture (GBA) also builds a basis for both the other sub-aspects in that GBA offers generic authentication capability for various applications based on a shared secret. Usually, GBA functionality is to bootstrap authentication and key agreement for application security, and it is based on the HTTP Digest AKA (Authentication and Key Agreement) mechanism in accordance with IETF RFC 3310.

In FIG. 2, there is illustrated a network model for generic bootstrapping. A bootstrapping server function BSF 13a and the user equipment UE 12, which are connected via a bidirectional link Ub, mutually authenticate using the AKA protocol, and agree on session keys. These keys are afterwards to be used for a bootstrapping session and to be used between the user equipment 12 and an operator-controlled network application function NAF 13b which is also connected to the user equipment 12 by means of a bidirectional link Ua. After the bootstrapping procedure, which is described in detail below, the user equipment 12 and the network application function 13b can run some application-specific protocol where the authentication of messages will be based on those session keys generated during mutual authentication. Accordingly, GAA/GBA can in general be regarded as a 3-party authentication scenario, wherein the bootstrapping server function 13a is further connected to a home subscriber system HSS 14 maintaining e.g. user security settings (USS).

The reference points (interfaces) between the individual entities in FIG. 2 are denoted by Ub, Ua, Zn, and Zh. The interfaces Zn and Zh are based on Diameter (according to the Diameter Base Protocol which is specified in IETF RFC 3588), the interface Ub is based on a reuse of HTTP Digest AKA messages, and the protocol used on the interface Ua depends on the application to be executed.

The utilization of the generic bootstrapping architecture is divided into two phases. The first phase, i.e. the (generic) bootstrapping procedure as such, is illustrated in FIG. 3, and the second phase, i.e. the generic bootstrapping usage procedure, is illustrated in FIG. 4.

In the bootstrapping procedure according to FIG. 3, the user equipment UE 12 sends an HTTP request towards the bootstrapping server function BSF 13a (step S31). In step S32, the BSF 13a retrieves the user profile and a challenge, i.e. authentication vector (AV), over the Zh interface from the home subscriber system HSS 14. Then, in step S33, the BSF 13a forwards authentication parameters RAND and AUTN to the UE 12 in order to demand the UE 12 to authenticate itself. The UE 12 calculates a message authentication code (MAC) so as to verify the challenge from the authenticated network, as well as calculates session keys CK, IK, and RES. Thus, the session keys CK, IK, and RES are available in both BSF 13a and UE 12. In step S35, the UE 12 sends again a request to the BSF 13a, and the BSF 13a checks in step S36 whether the received parameter is calculated using RES and is equal to the parameter that is similarly calculated using XRES which has been obtained before as a part of the authentication vector from the HSS 14. If these parameters are equal, the UE 12 is authenticated, and the BSF 13a generates a key ("master key") Ks by concatenating the session keys CK and IK (step S37). The key Ks is then used for securing the Ua interface. In step S38, the BSF 13a sends an OK message including a transaction identifier B-TID and other possible data (such as for example a lifetime of the key Ks) to the UE 12, by means of which the success of the authentication is indicated. By concatenating the session keys CK and IK, the key Ks for securing the Ua interface is then also generated at the UE 12 (step S39). Therewith, a bootstrapping session between the user equipment (client) and the bootstrapping server function has been started successfully.

In FIG. 4, an example procedure using a bootstrapped security association is depicted. After having initiated a bootstrapping session (S40a), the UE 12 can start to communicate with the network application function NAF 13b. Thereby, the master key Ks generated during bootstrapping procedure in the UE 12 and in the BSF 13a is used to derive the NAF-specific key Ks_NAF (step S40b). An application request (step S41) includes the transaction identifier B-TID obtained during bootstrapping, an application-specific dataset denoted by msg, and all credentials being denoted by MAC. In step S42, the NAF 13b requests one or more keys and possibly user profile data corresponding to the information supplied by the UE 12 over the Zn interface from the BSF 13a. Such a request can e.g. be based on the transaction identifier. Between steps S42 and S43, the NAF-specific key Ks_NAF is generated in the BSF entity 13a. In step S43, the BSF 13a responds by supplying the requested key or keys (including Ks_NAF and an application-specific part of the user profile being denoted by Prof) to the NAF 13b, which the NAF 13b uses directly, or with which the NAF 13b derives further keys required to protect the protocol used over the Ua interface towards UE 12, which is an application-specific functionality and not addressed in GAA specifications. Such a derivation is performed in the same way as the UE 12 did beforehand.

Then, the NAF entity 13b stores (step S44) at least the parameters Ks_NAF, Prof, and the lifetime of the key. Afterwards, the NAF 13b continues with the protocol used over the Ua interface by sending an application answer to the UE 12 (step S45).

For further details on the generic bootstrapping architecture, reference is made to the technical specification 3GPP TS 33.220 (version 6.3.0) of December 2004.

In view of the conventional generic authentication architecture and generic bootstrapping architecture described above, there arises the following problem.

In summary, the normal conventional 3GPP GAA behavior is that a client, i.e. a user equipment, bootstraps with the BSF entity using an AKA authentication vector. As a result, so called GAA credentials are obtained which consist of a shared key Ks and a bootstrapping transaction identifier (B-TID). These GAA credentials are further used to derive a server-specific key (Ks_NAF). The NAF-specific keys (i.e. B-TID and Ks_NAF) can then be used between the client UE and the server NAF, such as e.g. as username/password in existing protocols, which case is denoted by the term "generic".

The conventional bootstrapping procedure requires the client to have a bidirectional connection to the BSF entity, and the subsequent use of the NAF-specific credentials between the UE and the NAF typically requires this as well. Thus, the problem resides in that the conventional GAA and/or GBA mechanisms do not work, i.e. cannot be used for authentication, in case there is no return channel from the user equipment to the network. An example for such a scenario are broadcast networks, e.g. the user equipment being a set-top box (STB; or digibox) for digital video broadcasting. In such a scenario, GAA and/or GBA according to the prior art cannot be used as the UE can neither bootstrap with the BSF nor communicate with the NAF in a bidirectional manner, as is required.

In a contribution to the DVB-H (Digital Video Broadcasting for Handhelds) consortium and the ETSI (European Telecommunication Standards Institute), Vodafone presented a proposal for an interface for a USIM card-based element of the mechanism used to derive keys for service protection. However, this proposal is not suitable to overcome the problem described above and the related drawbacks.

Thus, a solution to the above problem and drawbacks is needed for providing security in such scenarios which are becoming more and more important for future use.

SUMMARY OF THE INVENTION

Consequently, it is an object of the present invention to remove the above drawbacks inherent to the prior art and to provide accordingly improved methods, network entities, a system, and a computer program product.

According to a first aspect of the invention, this object is for example achieved by a method for performing authentication between a client entity and a network comprising at least a bootstrapping server function entity and a network application function entity, wherein the client entity is not able to communicate with both of the network entities in a bidirectional manner, the method comprising the steps of transmitting a request for authentication information from the network application function entity to the bootstrapping server function entity when the network application function entity needs to securely transmit data to the client entity; processing the request and retrieving the authentication information at the bootstrapping server function entity; transmitting a response including the authentication information from the bootstrapping server function entity to the network application function entity; transmitting the authentication information and the data to be transmitted from the network application function entity to the client entity; and authenticating the network using the authentication information at the client entity.

According to further advantageous developments at least one of the following applies:

the step of transmitting the request is triggered by a means different from the client entity;

the request comprises at least a private identity of the client entity and an identity of the network application function entity;

the step of retrieving the authentication information comprises a step of fetching the authentication information from a home subscriber system;

the authentication information comprise at least a random challenge parameter and a network authentication parameter;

the response further comprises a key of the network application function entity;

the step of transmitting the authentication information further comprises a step of transmitting an identity of the network application function entity;

the step of authenticating the network further comprises a step of generating a key of the network application function entity at the client entity;

the authentication performed is a generic authentication in accordance with a generic authentication architecture;

the step of retrieving the authentication information further comprises a step of creating bootstrapping session data;

the authentication information comprise at least a random challenge parameter, a network authentication parameter, and bootstrapping session data;

the response further comprises a key of the network application function entity;

the step of transmitting the authentication information further comprises a step of transmitting an identity of the network application function entity;

the step of authenticating the network further comprises a step of generating a key of the network application function entity at the client entity;

the step of authenticating the network further comprises a step of establishing a bootstrapping session between the client entity and the bootstrapping server function entity;

the step of establishing a bootstrapping session is based on the authentication information transmitted from the network application function entity;

the step of authenticating the network further comprises a step of storing the bootstrapping session data at the client entity;

there exists a valid bootstrapping session between the client entity and the bootstrapping server function entity;

a valid bootstrapping session exists permanently;

the step of processing the request further comprises a step of triggering the client entity to establish a valid bootstrapping session;

the authentication information comprise at least bootstrapping session data;

the response further comprises a key of the network application function entity;

the step of authenticating the network further comprises a step of generating a key of the network application function entity at the client entity;

the method further comprises a step where the client entity initially contacts the network application function entity and sends its private identity;

the network application function entity triggers the client entity to establish a valid bootstrapping session;

the network application function entity triggers the bootstrapping server function entity so as to trigger an unsolicited bootstrapping procedure with the client entity;

the method further comprises a step of encrypting the data to be transmitted at the network application function entity using its key; and/or the method further comprises a step of decrypting the encrypted data at the client entity using the key of the network application function entity.

According to a second aspect of the invention, this object is for example achieved by a method for performing authentication between a client entity and a network comprising at least a bootstrapping server function entity and a network application function entity, wherein the client entity is not able to communicate with both of the network entities in a bidirectional manner, the method comprising the steps of transmitting a request for authentication information from the network application function entity to the bootstrapping server function entity when the network application function entity needs to securely transmit data to the client entity; processing the request and retrieving the authentication information at the bootstrapping server function entity, including a step of fetching the authentication information from a home subscriber system; transmitting a response including the authentication information, comprising at least a random challenge parameter, a network authentication parameter, and a key of the network application function entity, from the bootstrapping server function entity to the network application function entity; transmitting the authentication information, an identity of the network application function entity, and the data to be transmitted from the network application function entity to the client entity; and authenticating the network using the authentication information and generating a key of the network application function entity at the client entity.

According to a third aspect of the invention, this object is for example achieved by a method for performing authentication between a client entity and a network comprising at least a bootstrapping server function entity and a network application function entity, wherein the client entity is not able to communicate with both of the network entities in a bidirectional manner, said authentication being a generic authentication in accordance with a generic authentication architecture, the method comprising the steps of transmitting a request for authentication information from the network application function entity to the bootstrapping server function entity when the network application function entity needs to securely transmit data to the client entity; processing the request and retrieving the authentication information at the bootstrapping server function entity, including a step of creating bootstrapping session data; transmitting a response including the authentication information, comprising at least a random challenge parameter, a network authentication parameter, the bootstrapping session data, and a key of the network application function entity, from the bootstrapping server function entity to the network application function entity; transmitting the authentication information, an identity of the network application function entity, and the data to be transmitted from the network application function entity to the client entity; and authenticating the network using the authentication information and establishing a bootstrapping session between the client entity and the bootstrapping server function entity at the client entity.

According to a fourth aspect of the invention, this object is for example achieved by a method for performing authentication between a client entity and a network comprising at least a bootstrapping server function entity and a network application function entity, wherein the client entity is not able to communicate with both of the network entities in a bidirectional manner, wherein there exists a valid bootstrapping session between the client entity and the bootstrapping server function entity, the method comprising the steps of transmitting a request for authentication information from the network application function entity to the bootstrapping server function entity when the network application function entity needs to securely transmit data to the client entity; processing the request and retrieving the authentication information at the bootstrapping server function entity; transmitting a response including the authentication information, comprising at least bootstrapping session data and a key of the network application function entity, from the bootstrapping server function entity to the network application function entity; transmitting the authentication information and the data to be transmitted from the network application function entity to the client entity; and authenticating the network using the authentication information and generating a key of the network application function entity at the client entity.

According to a fifth aspect of the invention, this object is for example achieved by a client entity for use within an authentication architecture for performing authentication between the client entity and a network, the client entity comprising receiving means for receiving transmissions from the network, and authenticating means for authenticating the network using received authentication information.

According to a sixth aspect of the invention, this object is for example achieved by a client entity for use within an authentication architecture for performing authentication between the client entity and a network, the network comprising at least a bootstrapping server function entity and a network application function entity, and in which architecture the client entity is not able to communicate with both of the network entities in a bidirectional manner, the client entity comprising receiving means for receiving transmissions from the network application function entity, and authenticating means for authenticating the network using the received authentication information.

According to further advantageous developments at least one of the following applies:

the client entity further comprises key generating means for generating a key of the network application function entity;

the client entity further comprises establishing means for establishing a bootstrapping session between the client entity and the bootstrapping server function entity;

the client entity further comprises storing means for storing bootstrapping session data;

the client entity further comprises decrypting means for decrypting encrypted data received from the network application function entity using a key of the network application function entity;

the client entity further comprises processing and control means for processing data and signaling, and for controlling the client entity and its constituent means; and/or the client entity comprises at least a user equipment and is connectable to a universal subscriber identity module.

According to further advantageous developments of the fifth or sixth aspects at least one of the following applies:

the client entity is a set-top box;

the authenticating means is configured to access user identity information available at the client entity; and/or the user identity information are stored in a smart-card connectable to the client entity.

According to a seventh aspect of the invention, this object is for example achieved by a network entity for use within an authentication architecture for performing authentication between a client entity and a network, the network comprising at least the network entity being a network application function entity and a bootstrapping server function entity, and in which architecture the client entity is not able to communicate with both of the network entities in a bidirectional manner, the network entity comprising transceiver means for sending transmissions to the client entity, and for sending to and receiving from the bootstrapping server function entity, wherein the transceiver means is configured for transmitting a request for authentication information to the bootstrapping server function entity when the network application function entity needs to securely transmit data to the client entity, for receiving a response including the authentication information from the bootstrapping server function entity, and for transmitting the authentication information and the data to be transmitted to the client entity.

According to further advantageous developments at least one of the following applies:
the transceiver means is further configured for transmitting an identity of the network application function entity to the client entity;
the network entity further comprises encrypting means for encrypting the data to be transmitted to the client entity using the key of the network application function entity; and/or
the network entity is configured to broadcast transmissions.

According to a eighth aspect of the invention, this object is for example achieved by a network entity for use within an authentication architecture for performing authentication between a client entity and a network, the network comprising at least the network entity being a bootstrapping server function entity and a network application function entity, and in which architecture the client entity is not able to communicate with both of the network entities in a bidirectional manner, the network entity comprising transceiver means for sending to and receiving from the network application function entity, and processing and retrieving means for processing a request received from the network application function entity and for retrieving authentication information, wherein the transceiver means is configured for receiving the request from the network application function entity and for transmitting the authentication information to the network application function entity.

According to further advantageous developments at least one of the following applies:
the network entity further comprises fetching means for fetching the authentication information from a home subscriber system;
the network entity further comprises creating means for creating bootstrapping session data;
the network entity further comprises triggering means for triggering the client entity to establish a valid bootstrapping session; and/or
the network is a broadcast network.

According to a ninth aspect of the invention, this object is for example achieved by an authentication architecture system for performing authentication between a client entity and a network, the network comprising at least a bootstrapping server function entity and a network application function entity, and in which architecture the client entity is not able to communicate with both of the network entities in a bidirectional manner, the system comprising at least one client entity according to the fifth or sixth aspects, at least one network application function entity according to the seventh aspect, and at least one bootstrapping server function entity according to eighth aspect.

According to a further advantageous development the client entity of the authentication architecture system is a set-top box.

According to a tenth aspect of the invention, this object is for example achieved by a computer program product being loadable into a memory of a digital processing means and comprising software code portions for performing the steps of the method according to any one of the first to fourth aspects when said product is run on said digital processing means.

According to another advantageous technical solution according to the present invention, the network according to any of the above aspects is a broadcast network.

It is an advantage of the present invention that a solution is provided on how the 3GPP GAA concept can be used in scenarios where the client does not have a return channel back to the network.

With the embodiments of the present invention, the bootstrapping phase between the client and the bootstrapping server function is basically removed. Further, it is advantageous that this bootstrapping phase is partly combined with the meta-protocol (or the single messages) between the network application function and the client.

It is another advantage of the present invention that bootstrapping of authentication and key agreement is enabled for the scenario lacking a return channel, i.e. lacking a bidirectional connection to the network.

By means of the present invention, the GAA/GBA concept is thus broadened in its area of application.

BRIEF DESCRIPTION OF THE DRAWINGS

In the following, the present invention will be described in greater detail by means of embodiments thereof with reference to the accompanying drawings, in which.

DETAILED DESCRIPTION OF EMBODIMENTS OF THE PRESENT INVENTION

The present invention is described herein by means of embodiments thereof with reference to particular non-limiting example scenarios. A person skilled in the art will appreciate that the invention is not limited to these examples, and may be more broadly applied.

The present invention and its embodiments are exemplarily directed to cases for GAA and/or GBA environments where a client or user equipment does not have a return channel back to the network. With the network comprising at least a network application function entity and a bootstrapping server function entity, this means that a user equipment (client entity) is not able to communicate with both of the network entities in a bidirectional manner. Stated in other words, this means that the user equipment (client entity) lacks a bidirectional connection, i.e. a return channel, to the network application function entity, or to the bootstrapping server function entity, or to both of these entities.

Figure 1:
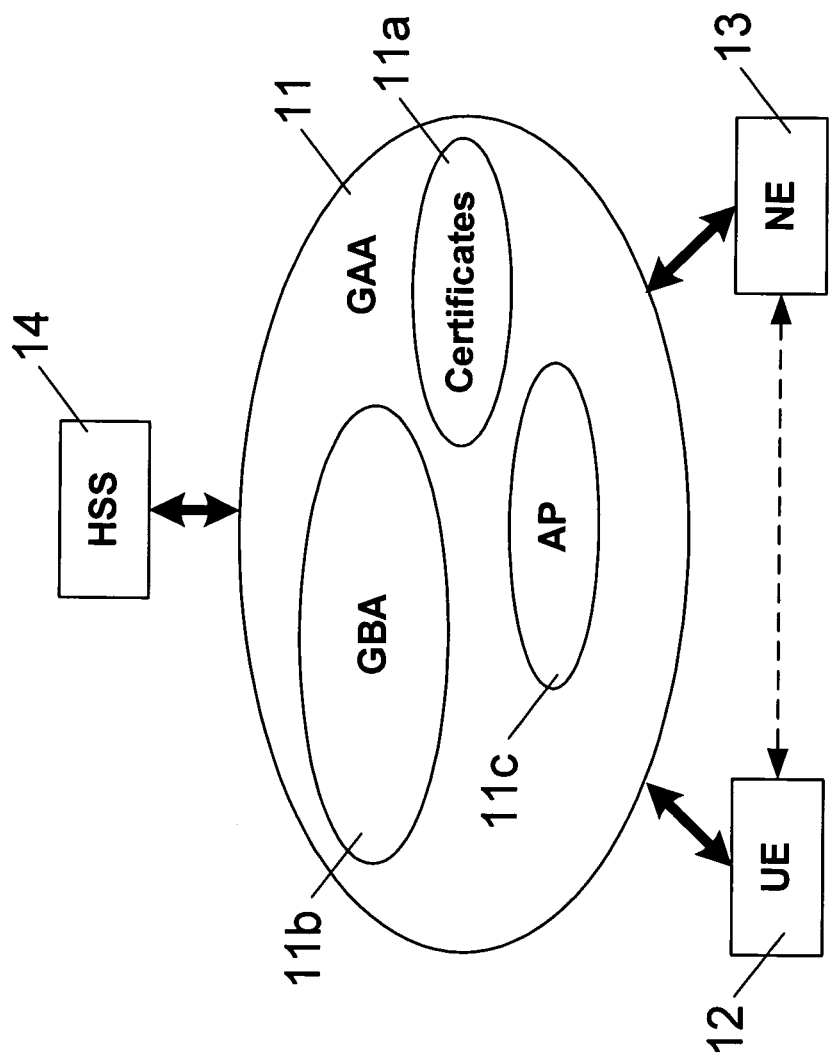
FIG. 1 illustrates an overview of a generic authentication architecture environment.
Figure 2:
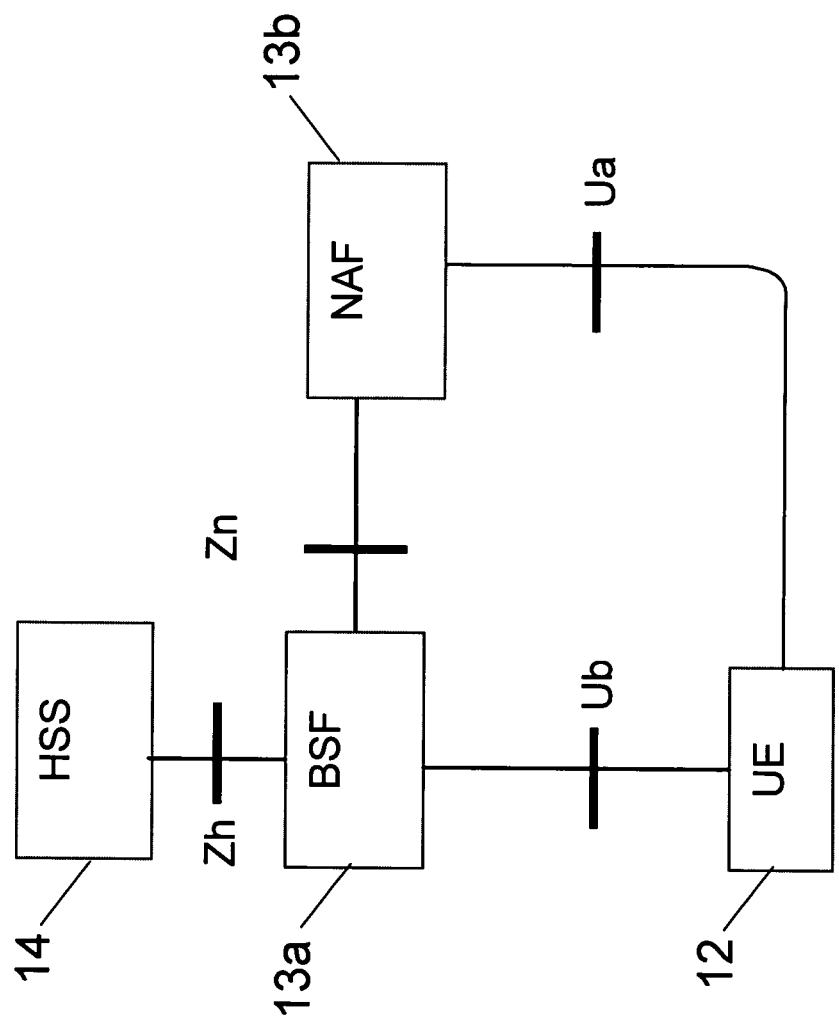
FIG. 2 illustrates a network model for generic bootstrapping.
Figure 3:
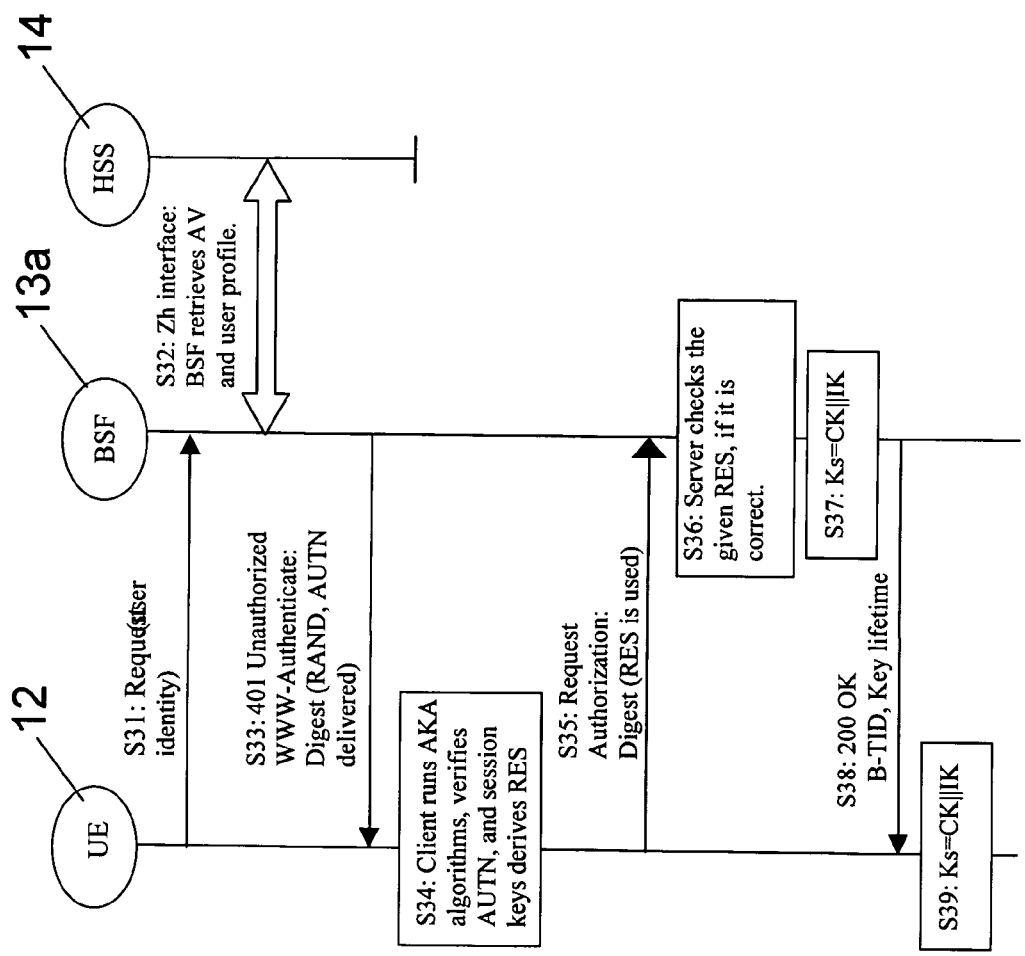
FIG. 3 illustrates a generic bootstrapping procedure according to the prior art.
Figure 4:
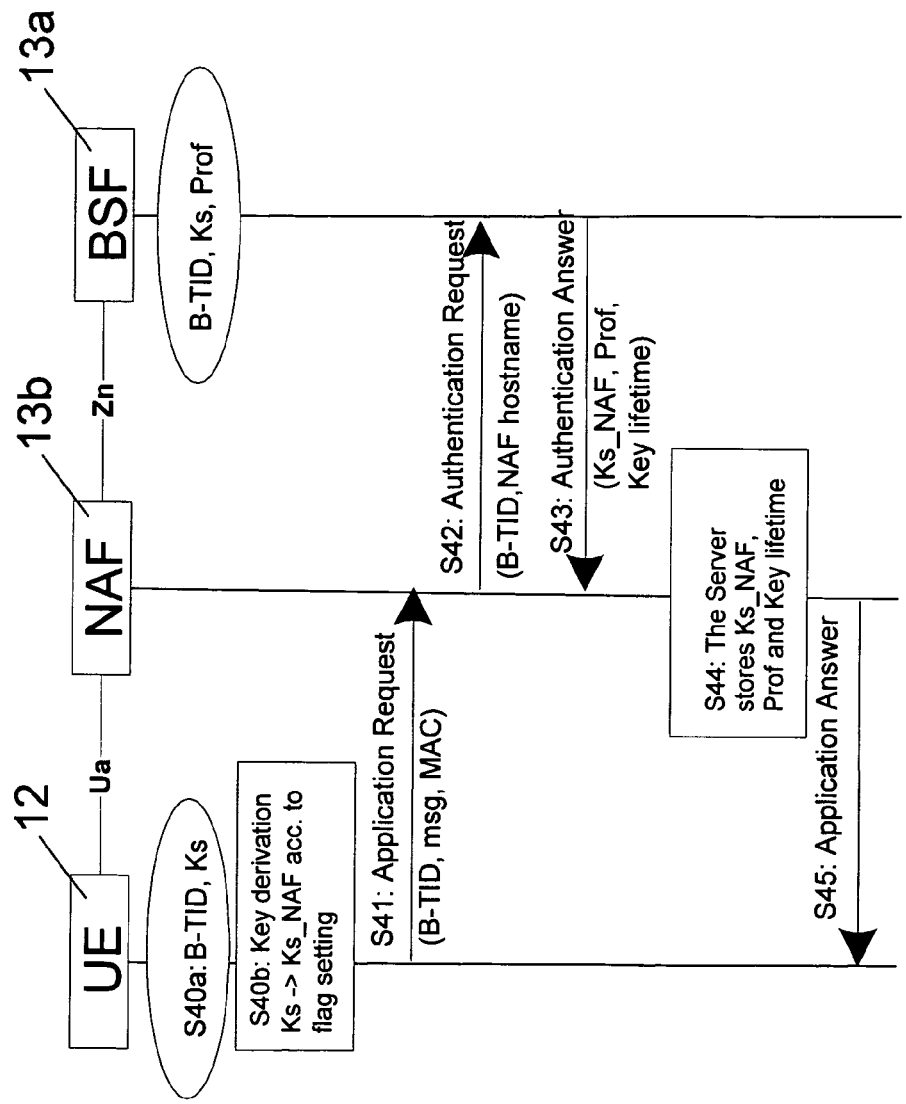
FIG. 4 illustrates a generic bootstrapping usage procedure according to the prior art.
Figure 5:
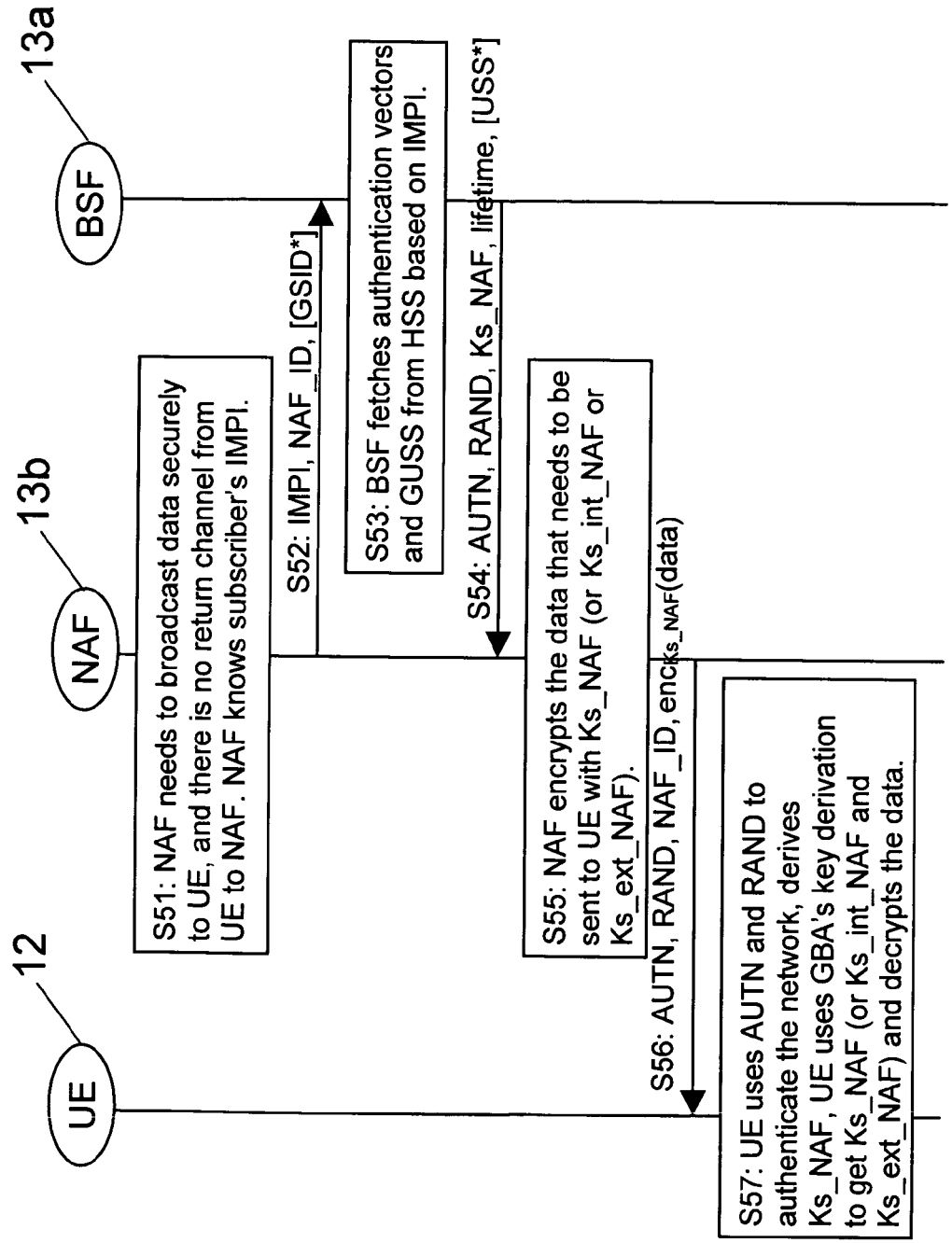
FIG. 5 illustrates a signaling diagram of a method according to a first embodiment of the present invention.

FIG. 5 illustrates a signaling diagram of a method according to a first embodiment of the present invention. FIG. 5 depicts a scenario where the client entity or user equipment UE 12 has no return channel to the network, i.e. the client entity is not able to communicate with both the network application function (NAF) entity 13b and the bootstrapping server function (BSF) entity 13a in a bidirectional manner. Thus, the client entity cannot perform a bootstrapping procedure with the BSF entity. An example for such a scenario may be a set-top box (STB; or digibox) which is equipped with a UICC (Universal Integrated Circuits Card) card reader.

A method for performing authentication between the client entity and the network so as to utilize GAA functionalities is described below.

In step S51, the NAF entity 13b needs to deliver some data (e.g., broadcast keys) to the client UE 12. The NAF entity 13b knows the private identity of the subscriber, i.e. the subscriber's IMPI (IP Multimedia core network subsystem private identity), and the data that need to be delivered to the UE 12. In step S52, the NAF entity 13b sends a request including the subscriber's IMPI, its own identity NAF_ID (i.e., NAF hostname), and optionally one or more GSIDs (GAA service identifiers for requesting NAF-specific user security settings) over the Zn reference point to the bootstrapping server function (BSF) entity 13a.

It is to be noted that the transmittal of the request (of step 2) may be triggered by a means different from the client entity. For example in the case of DVB-H, the authentication (bootstrapping) procedure or the need for such may be triggered in the network (for example in the NAF entity itself) by a need for updating broadcast keys in the terminal entity.

Upon receipt of the request from the NAF entity 13b, the BSF entity 13a checks in step S53 whether the NAF entity 13b is authorized to request authentication information, e.g. a network authentication element (AUTN) and a random challenge (RAND). If so, the BSF entity 13a fetches authentication vectors from a home subscriber system HSS 14, calculates the NAF entity's key Ks_NAF based on the NAF entity's identity NAF_ID and other key derivation parameters. It also extracts the requested user security settings USSs (if any) from subscriber's GBA user security settings (GUSS).

In a fourth step S54, the BSF entity 13a then sends the parameters AUTN, RAND, Ks_NAF, lifetime of Ks_NAF, and the requested USSs (if any) to the NAF entity 13b. The NAF 13b uses the key Ks_NAF to encrypt (or otherwise secure) the data to be transmitted to the client entity 12 (step S55). Optionally, in the case of UICC-enabled GBA (i.e. GBA_U) either of keys Ks_int_NAF and Ks_ext_NAF may be used for this purpose. However, the functionality of encrypting (as well as the below decrypting) is optional.

In step S56, the NAF entity 13b uses the broadcast channel between itself and the UE 12 to send parameters AUTN, RAND, NAF_ID, and the encrypted data to the UE 12. AUTN, RAND, NAF_ID, and the encrypted data itself may be further protected with other known means (e.g., by using a public key of the device certificate of the UE). When the UE 12 receives the data from the NAF 13b, it first uses the parameters AUTN and the RAND to authenticate the network. If this is successful, it will derive the bootstrapping key (Ks) from session keys CK and IK, and continue to derive the NAF-specific key Ks_NAF using Ks, NAF_ID, and other key derivation parameters. It can then decrypt the data using the key Ks_NAF, and take the data (e.g., broadcast keys) into use in the UE 12.

Consequently, the Ub reference point is not used at all in the presented method.

Figure 6:
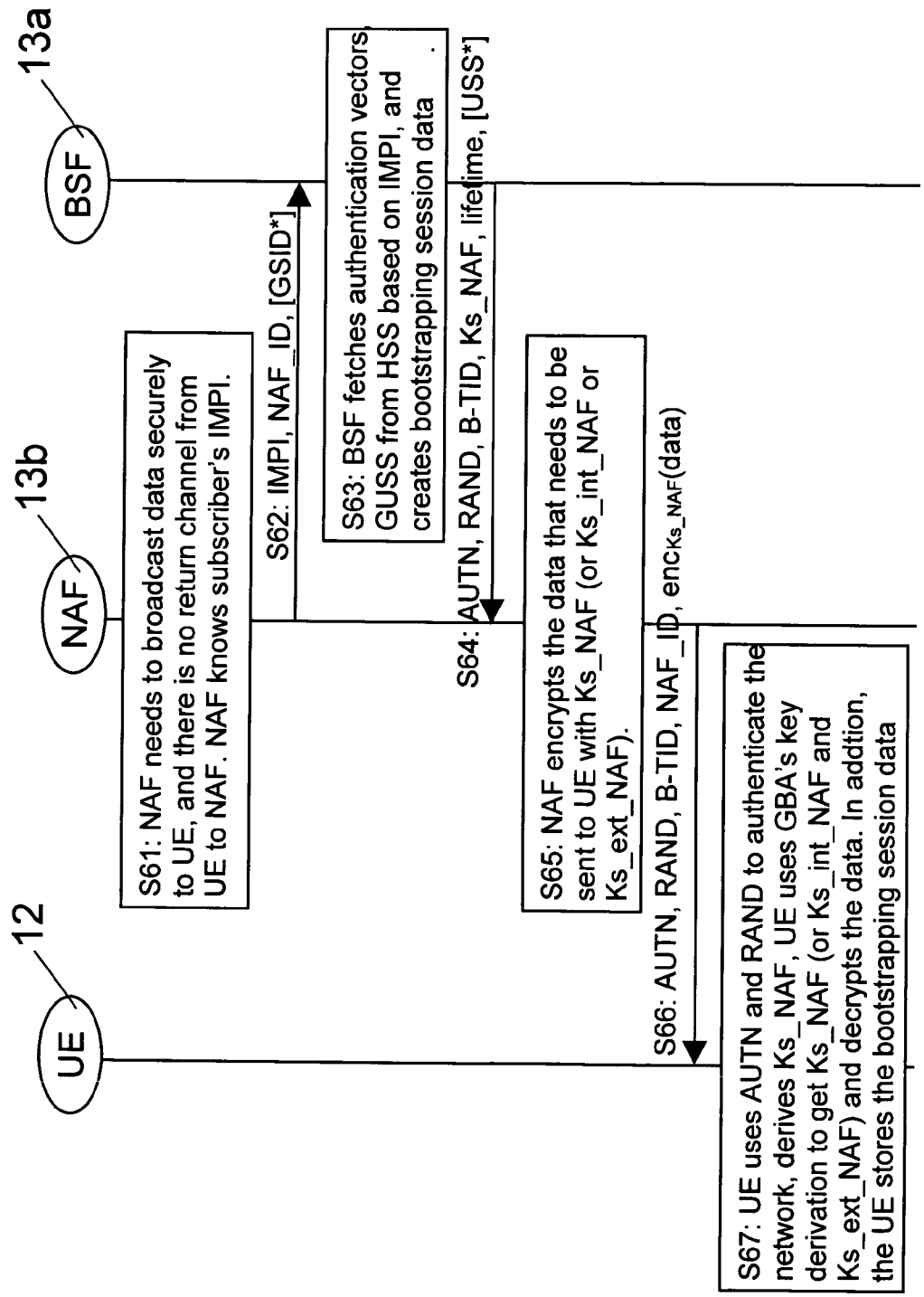
FIG. 6 illustrates a signaling diagram of a method according to a second embodiment of to the present invention.

FIG. 6 illustrates a signaling diagram of a method according to a second embodiment of the present invention. There is again depicted a scenario where the client entity UE 12 has no return channel to the network, and thus cannot perform a bootstrapping procedure directly with the BSF 13a entity. Rather, the bootstrapping takes place with the aid of a NAF entity. Hence, such a procedure may be referred to as reverse bootstrapping.

A reverse bootstrapping procedure according to the present embodiment takes place between the client entity UE 12 and the bootstrapping server function entity BSF 13a via a network application function entity NAF 13b. The procedure is described below.

In step S61, the NAF entity 13b needs to deliver some data (e.g., broadcast keys) to the client UE 12. The NAF entity 13b knows the identity of the subscriber, i.e. the subscriber's IMPI (see above), and the data that need to be delivered to the UE 12. According to conventional procedures, the UE 12 has always a connection to the NAF entity 13b and delivers a bootstrapping transaction identifier B-TID before the NAF entity 13b is able to request corresponding GBA keys from the BSF entity 13a.

In the method according to the present embodiment, the NAF entity 13b is triggered to fetch the GBA data by some other means.

The NAF entity 13b in step S62 sends the subscriber's IMPI, its own NAF_ID (i.e., NAF hostname), and optionally one or more GSIDs (GAA service identifiers for requesting NAF-specific user security settings) over the Zn reference point to the BSF entity 13a. According to conventional procedures, the identifier B-TID is used to fetch the GBA keys from the BSF 13a. In contrast thereto, the NAF entity 13b here uses the subscriber's IMPI to fetch the GBA data from the BSF 13a.

Upon receipt of the request from the NAF entity 13b, the BSF 13a checks in step S63 whether the NAF entity 13b is authorized to request authorization information such as parameters like AUTN and RAND, and be part of a reverse bootstrapping procedure according to the present embodiment. If so, the BSF entity 13a fetches authentication vectors from a home subscriber system HSS 14, calculates the key Ks_NAF based on the identity NAF_ID and other key derivation parameters. It also extracts the requested user security settings USSs (if any) from subscriber's GUSS. Then, still in step S63, the BSF entity 13a creates bootstrapping session data for the subscriber that can be used later with other NAFs 13b, too.

According to procedures of the prior art, the BSF entity 13a should contain the existing bootstrapping session data (identified by the bootstrapping transaction identifier B-TID), and calculate the key Ks_NAF as mentioned also above. In contrast thereto, the BSF entity 13a according to this embodiment creates bootstrapping session data without communicating with the client entity UE 12, which are to be used for calculation of Ks_NAF and a selection of USSs. In step S64, the BSF entity 13a sends parameters AUTN, RAND, B-TID, Ks_NAF, lifetime of the Ks_NAF, and the requested USSs (if any) to the NAF. Also AUTN, RAND, and B-TID is returned to the NAF. The NAF then (in step 5) optionally uses the key Ks_NAF to encrypt (or otherwise secure) the data to be transmitted. According to the current specifications, this is a NAF-specific functionality. (Note that GBA specifications are very open on what happens in the NAF 13b and how the NAF 13b uses the GBA keys.) As mentioned above, the functionality of encrypting (and decrypting) of data to be transmitted is purely optional in the framework of performing authentication.

In step S66, the NAF entity uses the (unidirectional) broadcast channel between itself and the UE 12 to send parameters AUTN, RAND, B-TID, NAF_ID, and the encrypted data to the UE 12. AUTN, RAND, NAF_ID, and the encrypted data itself may be further protected with other means (e.g., by OMA DRM 2.0 [2] and by using a public key of the device certificate of the UE 12).

According to current prior art standards, the identifier B-TID is transferred from the UE 12 to the NAF 13b. This would have taken place already before step S61 in a normal GBA procedure. According to the present embodiment, the identifier B-TID as well as the parameters AUTN and the RAND are sent from the NAF entity 13b to the client UE 12.

When the UE receives the data from the NAF 13b (step S67), it first uses the parameters AUTN and RAND to authenticate the network. If this is successful, it will derive the bootstrapping key (Ks) from session keys CK and IK, and continue to derive the NAF-specific key Ks_NAF using Ks, NAF_ID, and other key derivation parameters. It can then decrypt the data using the key Ks_NAF, and take the data (e.g., broadcast keys) into use in the UE 12. The UE 12 may also be configured to store the bootstrapping session data that can be used later with another NAF 13b. The UE 12 then establishes a bootstrapping session by means of the received parameters B-TID, AUTN, and RAND. Also, in the present embodiment, the key derivation is handled at this stage of the procedure (as the bootstrapping session became valid). The UE 12 may also use a newly created bootstrapping session with other NAFs 13b as long as the session is valid or a bootstrapping session is created.

Also here, the Ub reference point is not used at all in the presented method.

Figure 7:
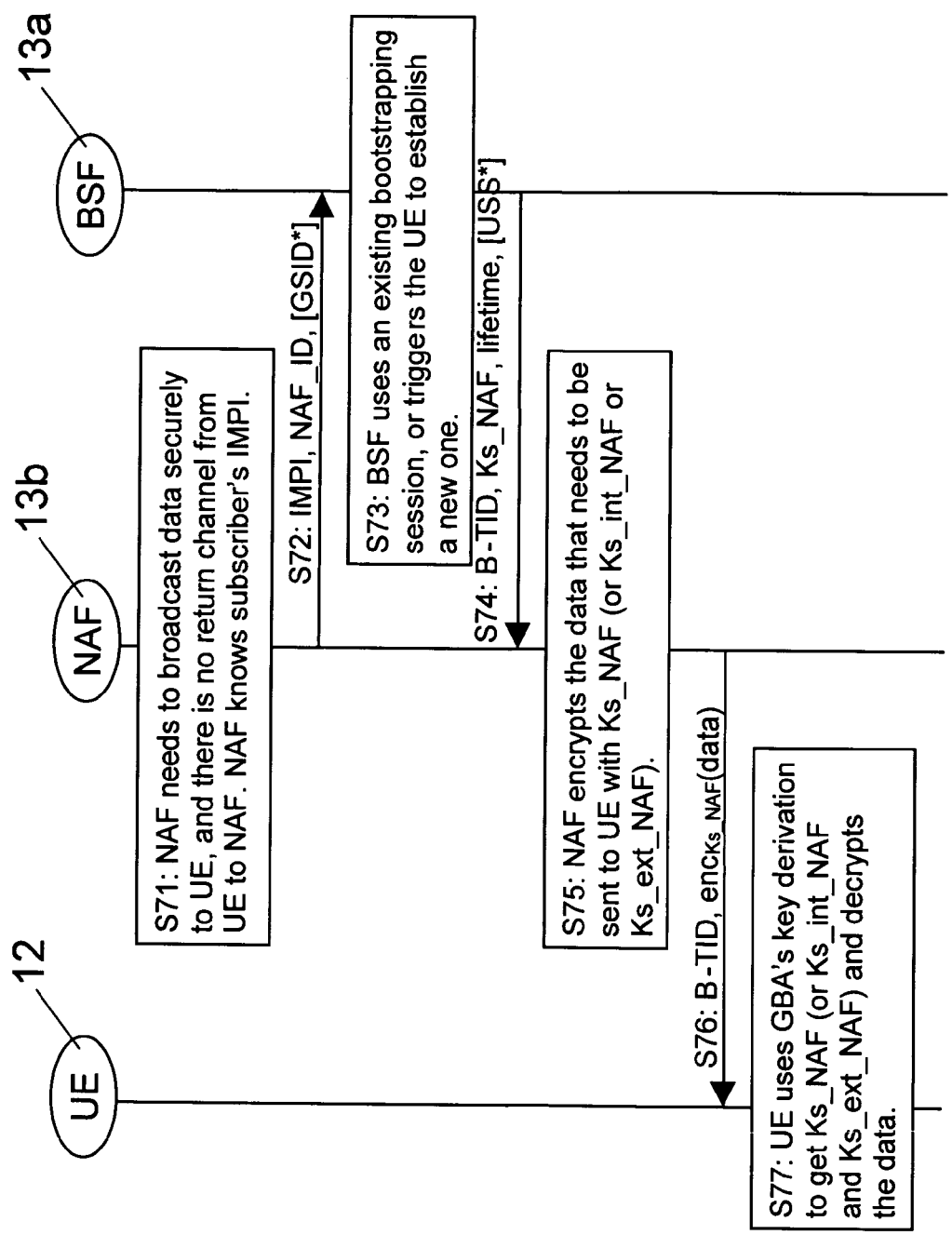
FIG. 7 illustrates a signaling diagram of a method according to a third embodiment of the present invention.

FIG. 7 illustrates a signaling diagram of a further method according to a third embodiment of the present invention. There is depicted a scenario where the client UE 12 has no return channel to the NAF entity 13b but does have such a bidirectional connection to other network elements such as the BSF 13a. That is, similar to the above scenarios, the client entity UE 12 is not able to communicate with both of the relevant network elements NAF 13b and BSF 13a in a bidirectional manner. However, in the present case, the client can perform a bootstrapping procedure with the BSF entity 13a. An example for such a scenario may be a mobile terminal that has 3G functionalities, e.g. IP connectivity, but it is also equipped with a facility to receive for example digital video broadcast for handheld terminals, i.e. is DVB-H enabled.

This scenario assumes that the UE 12 either has a valid bootstrapping session with the BSF 13a all the time (this could be a configuration option in the UE 12), or that the BSF 13a is able to trigger the UE 12 to run a bootstrapping session establishment (e.g., by using the Session Initiation Protocol (SIP)). The present method utilizes GAA functionalities is described below.

In step S71, the NAF entity 13b needs to deliver some data (e.g., broadcast keys) to the client entity UE 12. It knows the identity of subscriber, i.e. its IMPI, and the data that need to be delivered to the UE 12. The NAF entity 13b then sends the subscriber's IMPI, its NAF_ID (i.e., NAF hostname), and optionally one or more GSIDs (GAA service identifiers for requesting NAF-specific user security settings) over the Zn reference point (step S72). Up to this point, the method is rather similar to the one of the second embodiment above.

Upon receipt of the request from the NAF entity 13b, the BSF entity 13a checks in step S73 whether the subscriber has a valid bootstrapping session, and can be found in its databases. If it is not present, the BSF entity 13a can either indicate an error to the NAF entity 13b or trigger the client entity UE 12 to run a bootstrapping establishing procedure. The BSF entity 13a then calculates the key Ks_NAF based on the identity NAF_ID and other key derivation parameters. It also extracts the requested user security settings USSs (if any) from subscriber's GUSS. The BSF entity 13a sends the parameters B-TID, Ks_NAF, lifetime of the Ks_NAF, the requested USSs (if any) to the NAF entity 13b. Thus, the NAF entity 13b learns the valid bootstrapping transaction identifier B-TID when it receives this from the BSF entity 13a. In the fifth step, the NAF entity 13b may optionally use its key Ks_NAF to encrypt (or otherwise secure) the data to be transmitted. The NAF entity 13b uses the broadcast channel between itself and the UE 12 to send the parameters B-TID, NAF_ID, and the encrypted data to the client entity UE. The parameters B-TID, NAF_ID, and the encrypted data itself may be further protected with other means (e.g., by OMA DRM 2.0 [2] and by using a public key of the device certificate of the UE 12).

When the UE 12 in step S77 receives the data from the NAF entity 13b, it uses B-TID and NAF_ID to derive the NAF-specific key Ks_NAF using Ks (identified by B-TID), NAF_ID, and other key derivation parameters. It can then, if encrypted, decrypt the data using the Ks_NAF, and take the data (e.g., broadcast keys) into use in the UE 12. The functionality related to the GBA key usage in the UE 12 (as in the NAF 13b, see step S75) is NAF-specific. The key derivation is handled at this stage of the procedure.

The extensions/modifications when implementing the methods according to any one of the embodiments of the present invention into a GBA architecture according to the prior art are the following:

the NAF 13b is able to request AUTN and RAND (but not RES, CK, IK) and the GBA key derived from CK and IK (i.e. Ks_NAF, for example) by using subscriber's private identity (e.g. IMPI or IMSI) instead of B-TID;

the BSF 13a is able to create a bootstrapping session data for a subscriber based on NAF's request for AUTN and RAND;

in addition to normal data returned from the BSF 13a, also AUTN and RAND are returned (but not RES, CK, IK);

the UE 12 is able to create a bootstrapping session data based on AUTN, RAND, B-TID, and key lifetime received from the NAF 13b; and the NAF 13b is able to request bootstrapping session data (B-TID, NAF-specific, etc.) by using the subscriber's IMPI.

As a further embodiment of the present invention, there is conceivable a case where the client entity 12 cannot reach the BSF 13a, but has a 2-way channel to the NAF 13b. For example, this is the case when the UE 12 uses GBA for access authentication. The basic reverse GBA protocol cannot be used because the NAF 13b does not know the IMPI of the subscriber of the UE 12. Such a scenario could also be present for example in a WLAN (Wireless Local Area Network) case, where the client entity 12 needs to authenticate but only has a connection for example to an EAP (Extensible Authentication Protocol) server which could operate as the NAF entity 13b in such a case.

Accordingly, the client entity UE 12 performs a bootstrapping procedure (with the BSF entity 13a) via the NAF entity 13b. Signaling is similar to the above described procedures except that, before the first step, the UE 12 contacts the NAF entity 13b and sends its private identity IMPI.

A still further embodiment resides in a case where the NAF entity 13b has only a unidirectional channel to the UE 12, but the BSF 13a has a bidirectional channel to the UE 12.

In this embodiment, it is possible that
(1) the NAF entity 13b triggers the UE 12 to establish a valid bootstrapping session; or
(2) the NAF entity 13b triggers the BSF entity 13a so as to trigger an unsolicited bootstrapping procedure with the client entity UE 12.

According to further embodiments of the present invention, there are presented a client entity, a network application function entity, a bootstrapping server function entity, and a system for performing authentication between the client entity and the network in accordance with any one of the methods of the present invention.

Figure 8:
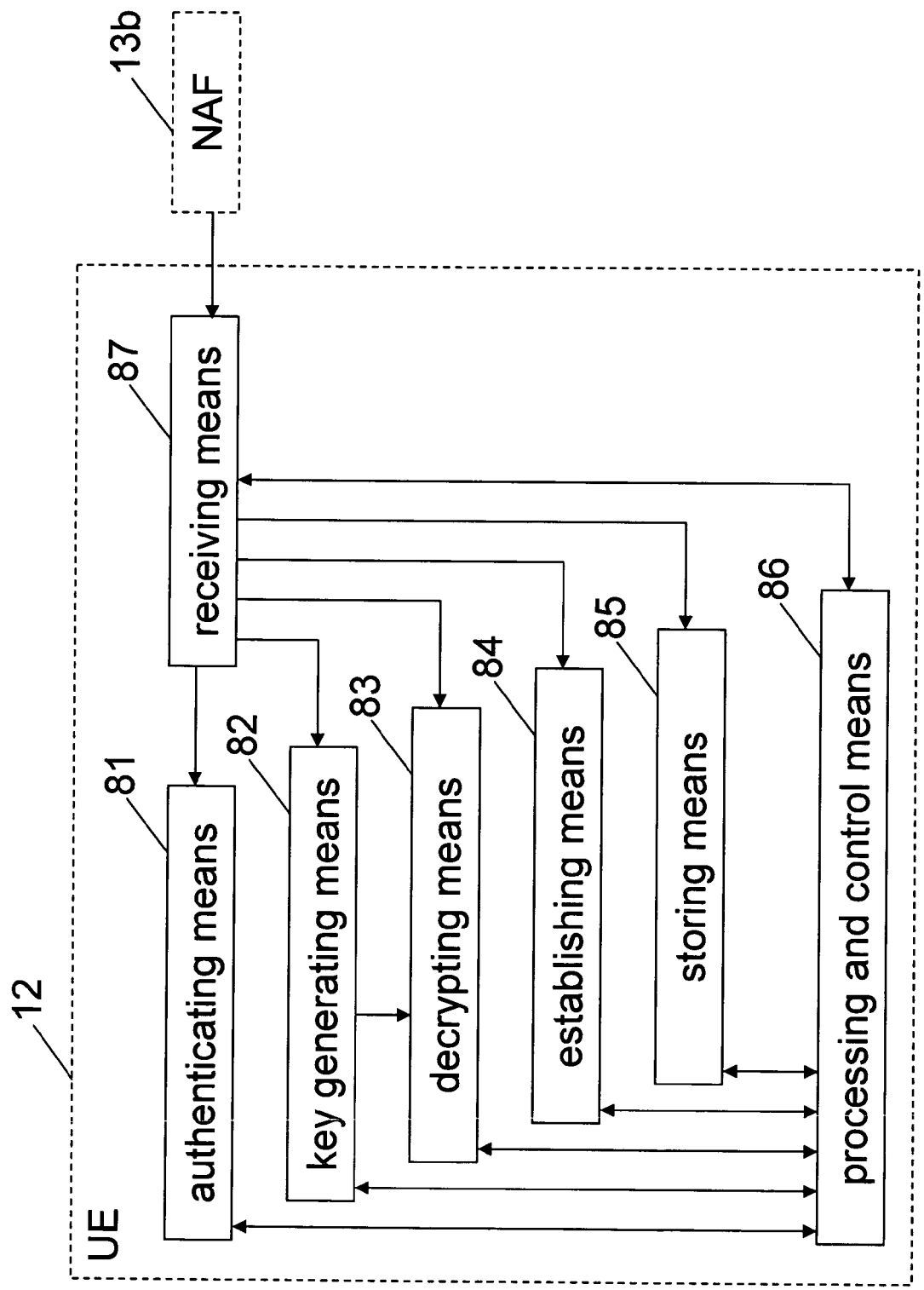
FIG. 8 illustrates a block diagram of a client entity according to an embodiment of the present invention.

FIG. 8 illustrates a block diagram of a client entity according to an embodiment of the present invention.

A client entity 12 according to one embodiment comprises receiving means 87 for receiving transmissions from the network application function NAF entity 13b and authenticating means 81 for authenticating the network using the received authentication information.

According to further embodiments, the client entity UE 12 optionally further comprises one or more of the following (as can be gathered from FIG. 8):
  key generating means 82 for generating a key of the network application function entity (e.g. Ks_NAF);
  establishing means 84 for establishing a bootstrapping session between the client entity 12 and the bootstrapping server function entity 13a;
  storing means 85 for storing bootstrapping session data; and/or
  decrypting means 83 for decrypting encrypted data received from the network application function entity 13b using a key of the network application function entity 13b, which is supplied from the key generating means 82.

The client entity 12 according to the embodiment shown in FIG. 8 further comprises processing and control means 86 which is configured to process data and signaling, and to control the client entity 12 as a whole as well as its constituents, such as e.g. the establishing means 84. For this purpose, the processing and control means 86 have bidirectional data and/or control connections to any one of the constituent means shown.

The client entity according to the present embodiment further comprises at least a user equipment and/or is connectable to a universal subscriber identity module in accordance with e.g. 3GPP standards.

Further, the client entity according to still another embodiment of the present invention is a set-top box (or digibox). If so, the client entity being such a set-top box is configured to be operated according to any appropriate known technique, such as for example according to DVB-H standards.

In the above embodiment, the authenticating means 81 of the client entity is configured to access user identity information available at the client entity. Such user identity information are for example used, in addition to received authentication information, for authentication purposes. These user identity information are for example stored in a smart-card connectable to the client entity, such as e.g. a UICC, a universal subscriber identity module (USIM), or a smart-card enabled for use according to DVB-H standards.

Figure 9:
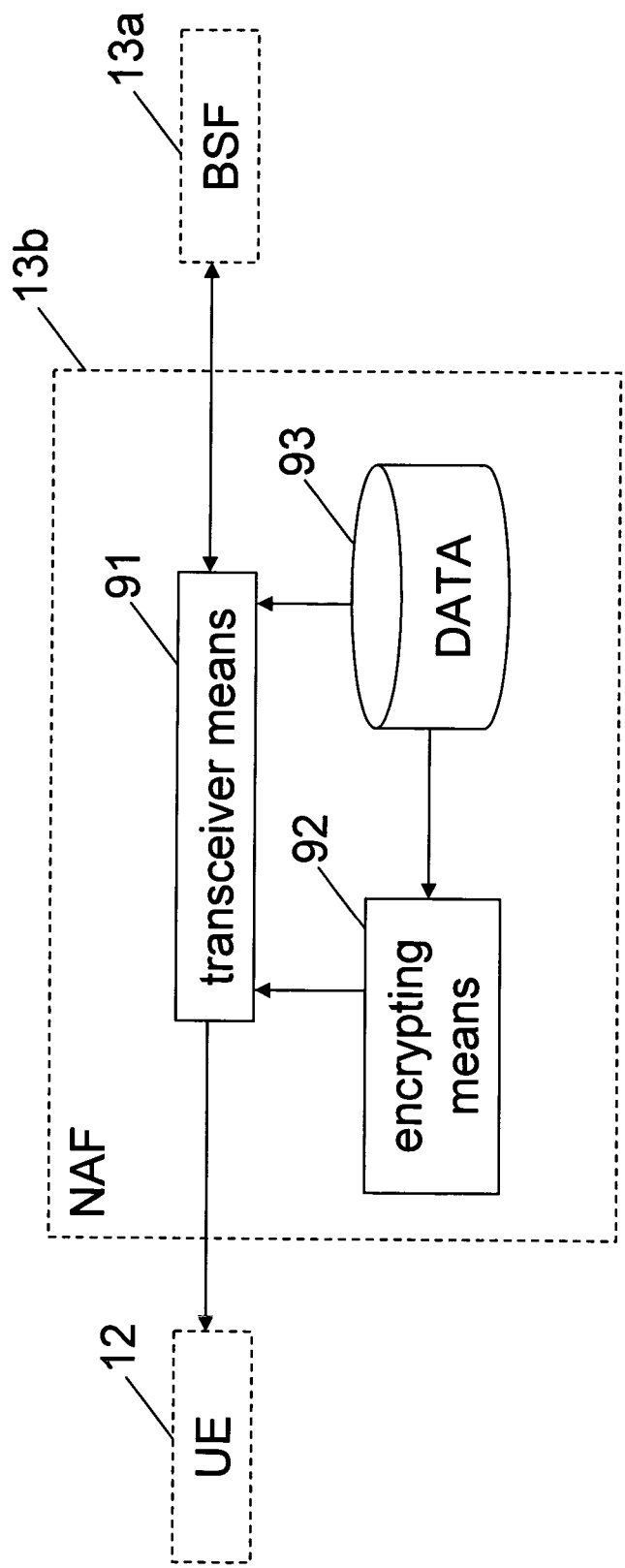
FIG. 9 illustrates a block diagram of a network application function entity according to an embodiment of the present invention.

FIG. 9 illustrates a block diagram of a network application function entity according to an embodiment of the present invention.

A network entity, in particular a network application function entity 13b, according to one embodiment comprises transceiver means 91 which are configured to send transmissions to a client entity 12, and to send to and receive from a bootstrapping server function entity 13a. The transceiver means 91 is e.g. configured to transmit a request for authentication information to the bootstrapping server function entity 13a when the network application function entity 13b needs to securely transmit data to the client entity 12, to receive a response including the authentication information from the bootstrapping server function entity 13a, and to transmit the authentication information and the data to be transmitted to the client entity 12.

According to further embodiments, the network application function NAF entity 13b optionally further comprises encrypting means 92 for encrypting the data to be transmitted to the client entity 12 using the key of the network application function entity 13b itself. According to FIG. 9, the data to be transmitted are represented by a database symbol labeled DATA 93.

Furthermore, the transceiver means 91 could be configured for transmitting an identity of the network application function entity 13b to the client entity 12. Such an identity may also be stored in the same database DATA 93 as the date to be transmitted.

The network entity according to a further embodiment of the present invention is configured to broadcast transmissions, e.g. to the client entity UE.

Figure 10:
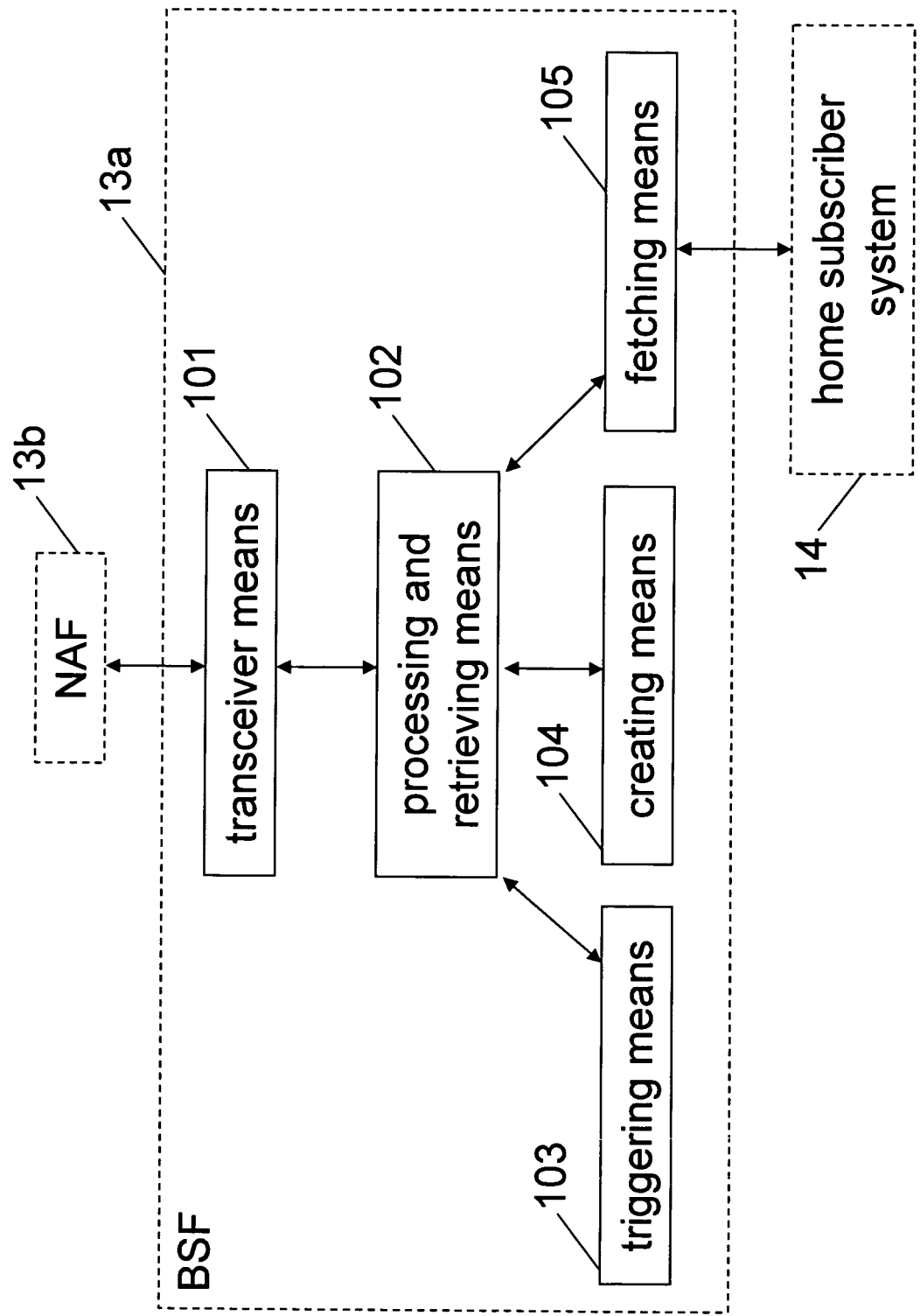
FIG. 10 illustrates a block diagram of a bootstrapping server function entity according to an embodiment of the present invention.

FIG. 10 illustrates a block diagram of a bootstrapping server function entity according to an embodiment of the present invention.

A network entity, in particular a bootstrapping server function BSF entity 13a, according to one embodiment comprises transceiver means 101 for sending to and receiving from a network application function entity 13b, and processing and retrieving means 102 for processing a request received from the network application function entity 13b and for retrieving authentication information. In the present embodiment, the transceiver means 101 is particularly configured for receiving the request from the network application function entity 13b and for transmitting the authentication information to the network application function 13b entity.

According to further embodiments, the bootstrapping server function entity BSF 13a optionally further comprises one or more of the following (as can be gathered from FIG. 10):
  fetching means 105 for fetching the authentication information from a home subscriber system HSS 14;
  creating means 104 for creating bootstrapping session data; and/or
  triggering means 103 for triggering the client entity 12 to establish a valid bootstrapping session.

A system according to the present invention comprises at least one client entity 12 (which may optionally be a set-top box), at least one network application function entity 13b, and at least one bootstrapping server function entity 13a according to FIGS. 8 to 10.

It is to be noted that in FIGS. 8 to 10 only those means and functional elements are depicted which are associated with the present invention. For the sake of simplicity, other means and functional elements which are known by a skilled person to form a part of any of the depicted apparatuses in their conventional structures are omitted.

In general, it is to be noted that the mentioned functional elements, i.e. the UE, the BSF, and the NAF according to the present invention, and their constituents can be implemented by any known means, either in hardware and/or software comprising one or more computer programs embodied on a non-transitory computer readable medium (e.g., computer readable storage devices), respectively, as long as it is configured to perform the described functions of the respective parts. For example, the authenticating means of the client entity can be implemented by any data processing unit, e.g. a microprocessor, being configured to authenticate the network using the received authentication information according to the method of the present invention. The mentioned parts can also be realized in individual functional blocks or by individual means, or one or more of the mentioned parts can be realized in a single functional block or by a single means. Correspondingly, the above illustration of FIGS. 8 to 10 is only for illustrative purposes and does not restrict an implementation of the present invention anyhow.

In summary, there are disclosed methods, a client entity, network entities, a system, and a computer program product for performing authentication between a client entity and a network, the network comprising at least a bootstrapping server function entity and a network application function entity, and wherein the client entity is not able to communicate with both of the network entities in a bidirectional manner, wherein the standard Ub reference point between the client entity and the bootstrapping server function entity is not utilized for authentication purposes. In short, the present invention discloses authentication using GAA functionality for unidirectional network connections.

According to an advantageous aspect of the present invention, the network is a broadcast network.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed is:

1. A method comprising:
transmitting a request for authentication information from a network application function entity to a bootstrapping server function entity when the network application function entity needs to securely transmit data to a client entity, the client entity having one or more unidirectional communication links with one or more of the bootstrapping server function entity and the network application function entity, the one or more unidirectional communication links lacking a return channel from the client entity to the network application function entity and from the client entity to the bootstrapping server function entity;
receiving a response including the authentication information from the bootstrapping server function entity at the network application function entity; and
transmitting the authentication information and the data to be transmitted from the network application function entity to the client entity using at least one of the one or more unidirectional communication links.

2. The method according to claim 1, wherein the transmitting the request is triggered by a means different from the client entity.

3. The method according to claim 1, wherein the request comprises at least one of a private identity of the client entity and an identity of the network application function entity.

4. The method according to claim 1, wherein the authentication information comprises at least a random challenge parameter, a network authentication parameter, or bootstrapping session data.

5. The method according to claim 4, wherein the response further comprises a key of the network application function entity.

6. The method according to claim 1, wherein the transmitting the authentication information further comprises transmitting an identity of the network application function entity.

7. The method according to claim 1, further comprising determining whether a valid bootstrapping session exists between the client entity and the bootstrapping server function entity.

8. The method according to claim 7, wherein the valid bootstrapping session exists permanently.

9. The method according to claim 1, further comprising initially contacting the network application function entity from the client entity and sending a private identity of the client entity to the network application function entity.

10. The method according to claim 1, further comprising triggering, by the network application function entity, the client entity to establish a valid bootstrapping session.

11. The method according to claim 1, further comprising triggering, by the network application function entity, the bootstrapping server function entity so as to trigger an unsolicited bootstrapping procedure with the client entity.

12. The method according to claim 1, further comprising encrypting the data to be transmitted at the network application function entity using a key of the network application function entity.

13. A method according to claim 1, wherein a network comprising the bootstrapping server function entity and the network application function entity comprises a broadcast network.

14. A method comprising:
transmitting a request for authentication information from a network application function entity to a bootstrapping server function entity when a network application function entity needs to securely transmit data to a client entity, the client entity having one or more unidirectional communication links with one or more of the bootstrapping server function entity and the network application function entity, the one or more unidirectional communication links lacking a return channel from the client entity to the network application function entity and from the client entity to the bootstrapping server function entity;
receiving a response including the authentication information, comprising at least a random challenge parameter, a network authentication parameter, or a key of the network application function entity, from the bootstrapping server function entity at the network application function entity; and
transmitting the authentication information, an identity of the network application function entity, and the data to be transmitted from the network application function entity to the client entity using at least one of the one or more unidirectional communication links.

15. A method comprising:
transmitting a request for authentication information from a network application function entity to a bootstrapping server function entity when the network application function entity needs to securely transmit data to a client entity, the client entity having one or more unidirectional communication links with one or more of the bootstrapping server function entity and the network application function entity, the one or more unidirectional communication links lacking a return channel from the client entity to the network application function entity and from the client entity to the bootstrapping server function entity;
receiving a response including the authentication information, comprising at least a random challenge parameter, a network authentication parameter, bootstrapping session data, or a key of the network application function entity, from the bootstrapping server function entity at the network application function entity; and
transmitting the authentication information, an identity of the network application function entity, and the data to be transmitted from the network application function entity to the client entity using at least one of the one or more unidirectional communication links.

16. A method comprising:
transmitting a request for authentication information from a network application function entity to a bootstrapping server function entity when the network application function entity needs to securely transmit data to a client entity, the client entity having one or more unidirectional communication links with one or more of the bootstrapping server function entity and the network application function entity, the one or more unidirectional communication links lacking a return channel from the client entity to the network application function entity and from the client entity to the bootstrapping server function entity, wherein there exists a valid bootstrapping session between the client entity and the bootstrapping server function entity;
receiving a response including the authentication information, comprising at least bootstrapping session data or a key of the network application function entity, from the bootstrapping server function entity at the network application function entity; and
transmitting the authentication information and the data to be transmitted from the network application function entity to the client entity using at least one of the one or more unidirectional communication links.

17. An apparatus comprising:
at least one processor; and
at least one memory including computer program code, the at least one processor, the at least one memory, and the computer program code configured to cause the apparatus to at least:
receive authentication information from a network application function entity via at least one of one or more unidirectional communication links; and
authenticate the network using the authentication information,
the apparatus being used within an authentication architecture for performing authentication between the apparatus and a network, the apparatus having the one or more unidirectional communication links with one or more of a bootstrapping server function entity and the network application function entity, the one or more unidirectional communication links lacking a return channel from the apparatus to the network application function entity and from the apparatus to the bootstrapping server function entity.

18. An apparatus according to claim 17, wherein the authenticating the network further comprises accessing user identity information available at the apparatus.

19. An apparatus according to claim 18, wherein the user identity information is stored in a smart-card connectable to the apparatus.

20. The apparatus according to claim 17, further comprising a key generator to generate a key of the network application function entity.

21. The apparatus according to claim 17, further comprising an establisher to establish a bootstrapping session between the apparatus and the bootstrapping server function entity.

22. The apparatus according to claim 17, further comprising storage to store bootstrapping session data.

23. The apparatus according to claim 17, further comprising a decryptor to decrypt encrypted data received from the network application function entity using a key of the network application function entity.

24. The apparatus according to claim 17, further comprising a processor to process data and signaling; and
a controller to control the apparatus and its constituents.

25. The apparatus according to claim 17, wherein the apparatus comprises at least a user equipment and is connectable to a universal subscriber identity module.

26. An apparatus according to claim 17, wherein the apparatus comprises a set-top box.

27. An apparatus comprising:
at least one processor; and
at least one memory including computer program code, the at least one processor, the at least one memory, and the computer program code configured to cause the apparatus to at least:
transmit a request for authentication information from the apparatus to the bootstrapping server function entity when the apparatus needs to securely transmit data to a client entity, the client entity having one or more unidirectional communication links with one or more of the bootstrapping server function entity and the apparatus, the one or more unidirectional communication links lacking a return channel from the client entity to the apparatus and from the client entity to the bootstrapping server function entity;
receive a response including the authentication information from the bootstrapping server function entity, and
transmit the authentication information and the data to be transmitted to the client entity using at least one of the one or more unidirectional communication links.

28. The apparatus according to claim 27, wherein the transceiver is configured to transmit an identity of the apparatus to one or more of the client entity and the bootstrapping server function entity.

29. The apparatus according to claim 27, further comprising an encryptor to encrypt the data to be transmitted to the client entity using a key of the apparatus.

30. An apparatus according to claim 27, wherein the apparatus is configured to broadcast transmissions.

31. An apparatus comprising:
at least one processor; and
at least one memory including computer program code, the at least one processor, the at least one memory, and the computer program code configured to cause the apparatus to at least:

receive a request from a network application function entity; and process the request received from the network application function entity and retrieve authentication information, and transmit the authentication information to the network application function entity, the transmitted authentication information being transmitted from the network application function entity to the client entity using at least one of one or more unidirectional communication links between the client entity and one or more of the apparatus and the network application function entity, the one or more unidirectional communication links lacking a return channel from the client entity to the network application function entity and from the client entity to the apparatus.

32. The apparatus according to claim 31, further comprising a fetcher to fetch the authentication information from a home subscriber system.

33. The apparatus according to claim 31, further comprising a creator module to create bootstrapping session data.

34. The apparatus according to claim 31, further comprising a trigger to trigger the client entity to establish a valid bootstrapping session.

35. An apparatus according to claim 31, wherein a network comprising the apparatus and the network application function entity comprises a broadcast network.

36. A computer program product comprising a non-transitory computer-readable medium encoded with instructions that, when executed by at least one processor, perform at least the following:

transmitting a request for authentication information from a network application function entity to a bootstrapping server function entity when the network application function entity needs to securely transmit data to a client entity, the client entity having one or more unidirectional communication links with one or more of the bootstrapping server function entity and the network application function entity, the one or more unidirectional communication links lacking a return channel from the client entity to the network application function entity and from the client entity to the bootstrapping server function entity;

receiving a response including the authentication information from the bootstrapping server function entity at the network application function entity; and transmitting the authentication information and the data to be transmitted from the network application function entity to the client entity using at least one of the one or more unidirectional communication links.

* * * * *